(12) United States Patent
Heuer et al.

(10) Patent No.: US 9,319,160 B2
(45) Date of Patent: Apr. 19, 2016

(54) METHOD FOR UPDATING AND METHOD FOR CHECKING AN UPDATE OF AT LEAST ONE DATA ELEMENT IN A DATA CAROUSEL, AND AN ASSOCIATED FIRST DEVICE, SECOND DEVICE, AND DATA FLOW

(75) Inventors: Joerg Heuer, Oberhaching (DE); Georges Martinez, Paris (FR); Uwe Rauschenbach, Poing (DE)

(73) Assignees: Siemens Aktiengesellschaft, Munich (DE); Google Technology Holdings, LLC, Mountain View, CA (US)

( * ) Notice: Subject to any disclaimer, the term of this patent is extended or adjusted under 35 U.S.C. 154(b) by 992 days.

(21) Appl. No.: 12/300,502

(22) PCT Filed: May 9, 2007

(86) PCT No.: PCT/EP2007/054502
§ 371 (c)(1),
(2), (4) Date: Sep. 11, 2009

(87) PCT Pub. No.: WO2007/131927
PCT Pub. Date: Nov. 22, 2007

(65) Prior Publication Data
US 2010/0037262 A1    Feb. 11, 2010

(30) Foreign Application Priority Data
May 12, 2006  (DE) .......................... 10 2006 022 704

(51) Int. Cl.
*G06F 3/00* (2006.01)
*G06F 13/00* (2006.01)
(Continued)

(52) U.S. Cl.
CPC .............. *H04H 60/25* (2013.01); *H04H 20/16* (2013.01); *H04H 20/426* (2013.01); *H04N 21/235* (2013.01); *H04N 21/23617* (2013.01); *H04N21/26291* (2013.01); *H04N 21/435* (2013.01); *H04H 40/09* (2013.01)

(58) Field of Classification Search
CPC .......... H04N 21/23617; H04N 21/262; H04N 21/26266; H04N 21/4349; H04N 21/4586; H04N 21/4332
See application file for complete search history.

(56) References Cited

U.S. PATENT DOCUMENTS 5,760,821 A * 6/1998 Ellis et al. ........................ 725/50
6,813,692 B2  11/2004 Morris et al.
(Continued)

FOREIGN PATENT DOCUMENTS

DE          10059006       7/2001
EP          0 926 895      6/1999
(Continued)

*Primary Examiner* — Joshua Taylor
(74) *Attorney, Agent, or Firm* — Occhiuti & Rohlicek LLP

(57) ABSTRACT

The invention relates to a method and a first device for updating at least one data element in a data carousel, in which an updating element is added to the data carousel for at least one group of at least one data element, wherein the updating element indicates either the time of update of at least one of the data elements of the group, or a time interval for checking an update of at least one of the data elements of the group. The invention also comprises a method and a second device for checking an update of a data element in a data carousel, wherein the checking of at least one of the data elements is performed on the basis of an updating element that is added in the data carousel for at least one group of data elements. Finally, the invention comprises a data flow that has an updating element in the data carousel for at least one group of data elements.

9 Claims, 1 Drawing Sheet

(51) Int. Cl.
*H04N 5/445* (2011.01)
*H04H 60/25* (2008.01)
*H04H 20/16* (2008.01)
*H04H 20/42* (2008.01)
*H04N 21/235* (2011.01)
*H04N 21/236* (2011.01)
*H04N 21/262* (2011.01)
*H04N 21/435* (2011.01)
*H04H 40/09* (2008.01)

(56) References Cited

U.S. PATENT DOCUMENTS

2005/0090235 A1* 4/2005 Vermola et al. ............ 455/414.3
2005/0210501 A1* 9/2005 Zigmond et al. ................ 725/32
2005/0229217 A1* 10/2005 Gin et al. ........................ 725/63

FOREIGN PATENT DOCUMENTS

| EP | 1 180 862 | 2/2002 |
| EP | 1333639 | 8/2003 |
| EP | 0 917 805 | 4/2005 |
| EP | 1 608 174 | 12/2005 |
| WO | 03/005703 | 1/2003 |
| WO | 03/079589 | 9/2003 |
| WO | 2005/045603 | 5/2005 |

* cited by examiner

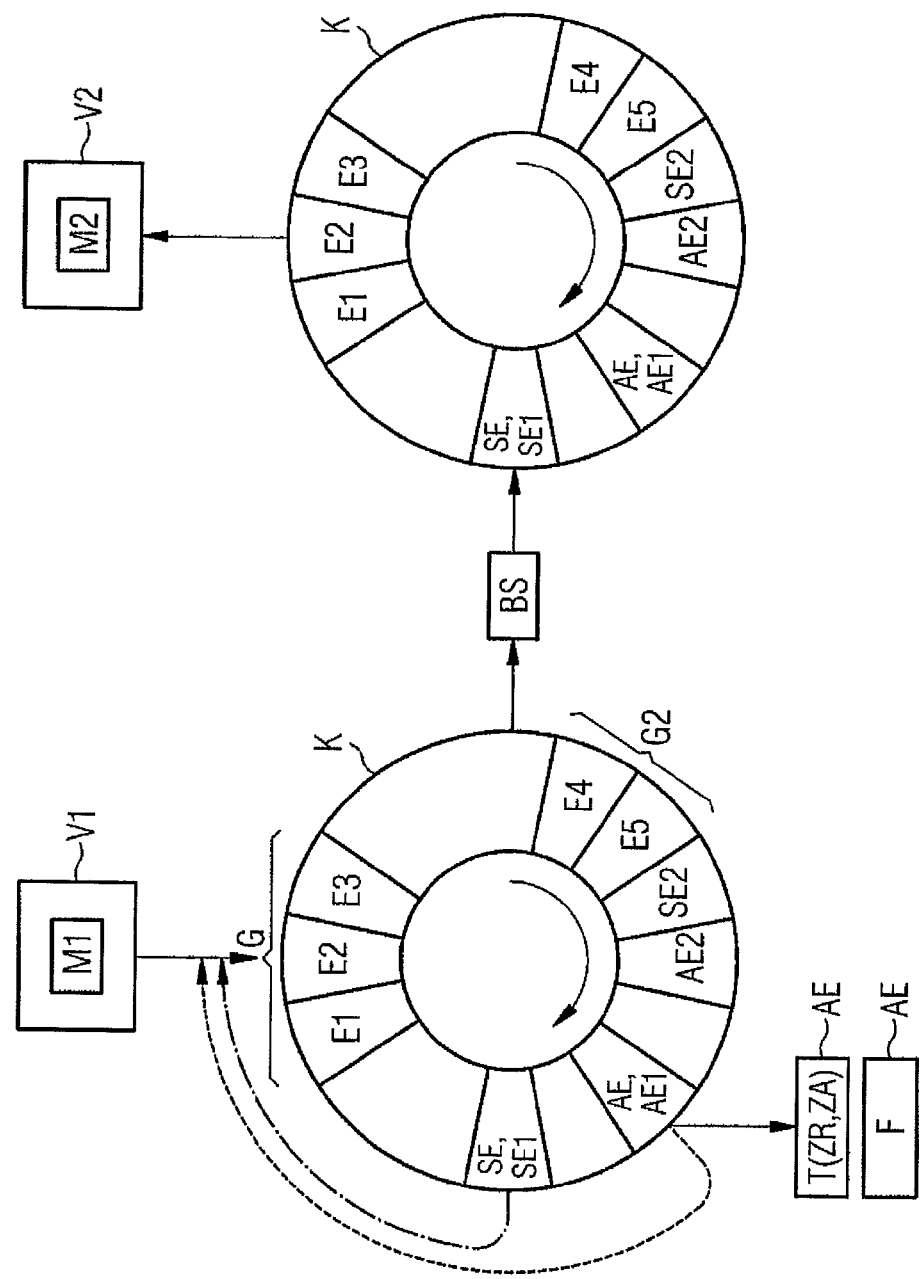

METHOD FOR UPDATING AND METHOD FOR CHECKING AN UPDATE OF AT LEAST ONE DATA ELEMENT IN A DATA CAROUSEL, AND AN ASSOCIATED FIRST DEVICE, SECOND DEVICE, AND DATA FLOW

CROSS-REFERENCE TO RELATED APPLICATIONS

This application is the National Stage of International Application No. PCT/EP2007/054502, filed on May 9, 2007, which claims the priority of German Application No. 10-2006-022704.2 on May 12, 2006. The contents of both applications are hereby incorporated by reference in their entirety.

The invention relates to a method and a first device for updating at least one data element in a data carousel and a method and a second device for checking an update of at least one data element in a data carousel. Further, the invention relates to a data flow.

Within a broadcasting system, e.g. a broadcasting system according to the DVB standard (DVB—Digital Video Broadcast) [1] or an OMA standard (OMA—Open Mobile Alliance) [2], e.g. an electronic service list, i.e. an Electronic Service Guide (ESG), is transmitted into a data carousel. This data carousel periodically provides elements included therein to a terminal. Further, a version number can be added to the elements of the data carousel allowing a detection of a change of data elements. Thus, due to the version number or the existence of a new data element it can be detected, whether the actual service list of the data carousel comprises new information in comparison with a service list already received.

Within certain periods, the data carousel is checked for changes, i.e. new information. Thereby, on the one hand, it can be stated in a global guideline within which fixed time periods a check should be made. This global guideline is definitely preset, e.g. by a standard or in an implementing guideline, e.g. a checking should be done every 30 minutes. Due to the rigid time periods preset by the global guideline, the adapting of the time periods for checking is not possible. On the other hand, for each element of the data carousel, the respective period of validity can be given, indicating that the element should not be used after the end of the related period of validity. Thus, the period of validity shows that it is not intended to change the element at least until the end of the period of validity. However, the validity of the element may exceed the respective period of validity by far. Thereby, it is of disadvantage that a message for checking the elements before the end of the period of validity is not possible. Especially in case of an irregular updating of an element within the data carousel, i.e. in case of an unexpected change of the element, the terminal can not be instructed to check the actuality of the elements before the end of the respective periods of validity. Further, this procedure features high administrative costs in view of the respective periods of validity and a high need for bandwidth for transmitting the periods of validity of the elements.

The objective of the invention is to provide a method as well as a transmitting and a receiving device, which offers a high flexibility in receiving updated elements in a data carousel.

This objective is solved by the independent claims. Further developments are given in the dependent claims.

The invention relates to a method for updating at least one data element in a data carousel, in which for at least one group of at least one data element an updating element is added to the data carousel, the updating element indicating either the time of the updating of at least one of the data elements of the group or the time period for checking an updating of at least one of the data elements of the group. Further, the invention also comprises one method for checking an updating of a data element in a data carousel, checking at least one data element on the basis of an updating element which has been added for at least one group of at least one data element in the data carousel, wherein the updating element shows the updating time of at least one data element of the group and/or the time period for checking the updating of at least one data element of the group.

The respective method provides a high flexibility when receiving elements of the data carousel, which have to be updated, as the time of updating the group of data elements or the time period for executing at least the next updating can be determined individually. Thereby, when using several groups, the time of updating and/or the time period can be set and evaluated for each group separately. Using the respective method, a fast access to updated data elements is possible, as a determination of the updating by means of the time of updating and/or the time period cannot be specified by means of a global specification, but can be specified for the group on an individual basis. Further, it is possible to realize the respective method saving resources, because instead of a global updating, where a large number of data elements have to be checked for updating, only those data elements have to be analyzed, which are of interest and/or relevance to a receiver. The group comprises one or more data elements, while it is possible to transmit these data elements in the carousel in random order, e.g. in a timely consecutive order.

Preferably, in accordance with the methods, the time of updating the data element is defined by a relative time specification or by an absolute time specification. Thus, the exact time of realizing the updating can be determined.

In an alternative extension of the respective method, a checking of a data carousel for determining the time of the first updating within respective check periods is being performed until the receipt of the first updating, wherein especially a time period of the check interval is shorter than the time period of the time interval (F) wherein the time of the next checking is determined by adding the time intervals (F) at the time of the first updating. Using this specific method, by using the time period, the time-dependent determination of the next updating to be realized will be improved. Especially by using a time period of the test interval, which is shorter than the time period of the time interval, it is achieved that the next updating is recognized on time. Otherwise is could happen that only the next but one updating is detected.

Preferably, a status element for updating the group in the data carousel is added for the respective method, the status element indicating a regular or an irregular updating of at least one of the data elements of the group, wherein the checking of the updating is performed during the regular updating based on the updating elements only. Herewith, the recognizing of the next updating can be improved in those cases where also irregular updatings are done.

In a further alternative or additional extension of the respective method, a respective associated updating element and/or an associated status element is added for a respective group of data elements. Thus, several groups can be processed in accordance with the respective methods.

The invention further comprises a first apparatus for realizing a method for updating at least one data element in a data carousel, wherein first means are adapted to add for at least one group of at least one data element an updating element in the data carousel, wherein the updating element indicates the time of updating of at least one of the data elements of the group and/or a time period for the processing of checks of the updating of at least one data element of the group. Thereby, the method for updating can be implemented and realized.

Furthermore, the invention comprises also a second apparatus for performing the checking of the updating of one data element in a data carousel, wherein a second means is suited, on the basis of an updating element which is added for at least one group of at least one data element in the data carousel, to realize the checking of at least one data element, wherein the updating element indicates the updating time of at least one of the data elements of the group and/or the time interval for executing checks of an updating of at least one data element of the group. Thus, the method for doing the checking of an updating can be implemented or realized.

The first and/or second apparatus can be implemented and realized in hardware and/or software or in one combination of hardware and software. The first apparatus is integrated and realized e.g. in a DVB transmitter or in a server of a streaming service. The second apparatus can be part of a DVB receiving unit of a Setop box or a portable receiving unit, especially a mobile phone.

Finally, the invention comprises a data flow which comprises one updating element in the data carousel for at least one group of at least one data element, the updating element indicating the updating time of at least one of the data elements of the group and/or a time period for processing the checks of an updating of at least one of the data elements of the group. This data flow is transmitted e.g. using an IP-based network (IP—Internet Protocol), WLAN (WLAN—Wireless Local Area Network) or UMTS (UMTS—Universal Mobile Telecommunications System). The data flow can be realized digitally by single bits or bytes.

Preferably, the data flow comprises a status element for updating the group in the data carousel wherein the status element is indicating one regular or one irregular updating of at least one of the data elements of the group. Thus, the regular or irregular updating can be transmitted from the first apparatus, e.g. from a transmitter, to the second apparatus, e.g. a receiver.

The invention and its embodiments are illustrated in more detail in the drawing. The only FIGURE symbolically shows a carousel with several elements and a first and a second device.

In the FIGURE, the same reference numerals are used to designate the elements with the same function and the same mode of operation.

An exemplary embodiment is shown in the only FIGURE. Thereby, elements such as data elements E1, E2, E3 are written into a memory and read out clockwise, as indicated by a bent arrow. The ring memory and the linear reading out of the elements in the ring memory represent a data carousel K, in which the elements are output cyclically and are sent to a receiver, e.g. a DVB receiver.

In this example of embodiment, the data elements E1, E2, E3 represent objects of an electronic service directory, i.e. an Electronic Service Guide (ESG). They are combined in a group G1, the group G1 comprising at least one single data element. Additionally, an activating element AE is assigned to the group G1 which is also inserted into the carousel K. Using a bent arrow, it is illustrated in the FIGURE that the activating element AE is related to the group G1.

A cyclical transmission of the elements of the data carousel K shows the following body structure in this exemplary embodiment, wherein the transmission is realized from the left hand to the right hand:

... E1 E2 E3 ... AE ... E1 E2 E3 ... AE ....

This transmission represents a data flow BS. The activating element AE indicates at which activating time T in the future the transmitter regularly will decide whether he updates at least one the data elements E1 of the group G1. This will be realized by an absolute time specification ZA. The absolute time specification ZA can be given in a format according to the NTP standard (NRP—Network Time Protocol) [3]. In an alternative embodiment, the activating element AE is determined based on a relative time specification ZR, e.g. AE=18 min. Hereby, the activating element communicates that the updating will be realized within 18 minutes. The relative time specification represents a time period which is measured starting at a time which is also known by the receiver, e.g. the time of receiving the activating element.

Stating the activating time T, the second apparatus V2 comprising at least second means M2 is able to determine the time at which a change of at least one element in the data carousel takes places regularly. Thus, the second apparatus V2 can be in a stand-by condition until the activating time T and thus can save computing power.

In an alternative embodiment of the activating element AE, the same is defined by a time period F in order to update at least one of the data elements of the group G1. The time period F is e.g. F=5 minutes. Using the time period F, it is indicated in which time periods data elements of the group G1 have to be checked with regard to updating.

In an extension of the method, a status element SE is allocated to the group G1, the status element indicating if an updating of at least one of the data elements of the group G1 is regular or irregular. An irregular updating of the data element within the data carousel is the result of an unexpected change of the data element, e.g. due to a current event which is not predictable. This can be red-hot news in the field of politics which are described by the data element.

A regular updating of the data element within the data carousel follows e.g. from a change of the data element which is predeterminable. If the data element describes e.g. a currently transmitted broadcast of a broadcasting channel, this description will be updated if the transmitted broadcast has changed. This complies e.g. with the ESG. In the FIGURE, by using a dotted-dashed arrow it is shown that the status element SE is related to the group G1.

In order to determine the activating time T on the basis of the time interval F, wherein a check of an updating for the elements of the group should take place, the status element SE is evaluated. If the actual updating is to be an irregular updating, the time of an actual updating for the determination of the next point of time for a subsequent updating by means of the time period will not be considered. In the case of a regular actual updating, the time of the actual updating is used for determining the next time for a subsequent updating with the use of the time interval F.

Using the status element SE can be applied when synchronizing the second apparatus V2 to the data carousel K. The apparatus V2 reads-in the elements of the data carousel which are transmitted cyclically. However, a further point of time for a subsequent updating using the time period is unknown to the second apparatus V2, because it does not know the time for the last updating. The second apparatus V2 checks within test intervals, which can be shorter in comparison to the time period F, e.g. every 2 minutes, if at least one element of the group was updated. If the updating is detected, it is checked if this updating was regular. If this is the case, the checking of the updating of the group is continued within a certain time interval of the check until a regular updating of the group. When the regular updating of the group is recognized, i.e. during updating of at least one data element of the group, the time of the actual updating is known, so that the next updating using the time interval is determinable in advance due to that reason.

The data flow BS comprises at least the group G1 comprising at least one data element E1 and the activating element AE. Further, the data flow BS can comprise the status element SE. The creating of the data flow BS can be realized by a first means M1 of a first apparatus V1. The data flow BS can be received by the second means M2 of the second apparatus V2 and can be inserted in the data carousel K and/or can be evaluated.

The first means M1 of the first apparatus V1 performs the updating of at least one data element in the group, whereby the first means creates the updating element AE and/or the status element SE and record it into the data carousel.

In the FIGURE, for the first device and the second device, a data carousel K is drawn in respectively. If will occur no transmission errors during a transmission of the data flow BS from the first apparatus, e.g. a transmitter, to the second apparatus, e.g. a receiver, the first and the second data carousel are identical.

Within an alternative extension, several groups G1, G2 are formed, such as group G1 with the data elements E1, E2, E3 and group G2 with the data elements E4 and E5. Each group is assigned to an activating element AE, AE1, AE2 on its own, such as the group G1 to the activating element AE1 and the group G2 to the activating element AE2. In addition, a respective status element SE, SE1, SE2 can be assigned to each group, such as the status element SE1 to the group G1 and the status element SE2 to the group G2.

BIBLIOGRAPHY

[1] DVB—Digital Video Broadcast, "IP-Datacast over DVB-H: Electronic Service Guide (ESG)", November 2005, DVB Document A099
[2] OMA—Open Mobile Alliance, "Service Guide for Mobile Broadcast Services", Draft Version 1.0, 24. March 2006, OMA-TS-BCAST_ServiceGuide-V1_0_0-20060324-D
[3] Mills et al, "Network Time Protocol (Version 3)", IETF RFC 1305, March 1992

The invention claimed is:
1. A method for updating a data carousel,
wherein the data carousel comprises a plurality of data elements combined in a plurality of groups,
the method comprising:
adding an activating element to at least a group of said plurality of groups of said data carousel,
said added activating element indicating either
an updating time at which at least one of the data element in the group is updated, or
a time interval for executing checks regarding the updating of at least one of the data elements of said group; and
checking the data carousel for determining a time of updating,
wherein said checking step is performed in a test time intervals, until a confirmation regarding the updating is received,
wherein the test time interval allocated to checking is shorter than a preset time interval,
wherein a time of a next checking is determined by adding the test time interval to the updating time,
adding a status element for updating said at least one group of said plurality of groups of said data carousel,
wherein said status element indicates at least one of a regular updating and an irregular updating of the at least one data element of said group,
said irregular updating being the result of an unexpected change of the at least one of the data element, and
evaluating said status element to determine if the status element indicates a regular updating or an irregular updating wherein if said updating is an irregular updating, a time updating for the determination of the next point of time for a subsequent updating by means of the time interval is not considered, and
wherein if said updating is a regular updating, a time of the actual updating is used for determining a time for a subsequent updating with the use of the activating element.
2. The method according to claim 1, wherein said updating time is one of a relative time specification or an absolute time specification.
3. The method according to claim 1 wherein for a group of data elements at least one of an associated activating element and an associated status element is added.
4. A method for checking an updating of a data element in a data carousel, wherein the data carousel comprises a plurality of data elements combined in a plurality of groups, the method comprising:
performing checking, on the basis of an activating element which is added to at least a group of said plurality of groups of said data carousel,
wherein said added activating element is indicating either an updating time
at which at least one of the data element in the group is updated, or
a time interval for executing checks regarding the updating of the at least one data element of said group, and
checking the data carousel for determining a time of updating,
wherein said checking step is performed in a test time intervals, until a confirmation regarding the updating is received,
wherein the test time interval allocated to checking is shorter than a preset time interval,
wherein a time of a next checking is determined by adding the test time interval to the updating time,
adding a status element for updating said at least one group of said plurality of groups of said data carousel,
wherein said status element indicates at least one of a regular updating and an irregular updating of the at least one data element of said group,
said irregular updating being the result of an unexpected change of the at least one of the data element, and
evaluating said status element to determine if the status element indicates a regular updating or an irregular updating
wherein if said updating is an irregular updating, a time updating for the determination of the next point of time for a subsequent updating by means of the time interval is not considered, and
wherein if said updating is a regular updating a time of the actual updating is used for determining a time for a subsequent updating with the use of the activating element.
5. The method according to claim 4, wherein the updating time is one of a relative time specification or an absolute time specification.

6. The method according to claim 4 comprising for a respective group of data elements at least one of an associated activating element and an associated status element is added.

7. An apparatus for performing a method for updating a data carousel according to claim 1,
wherein the data carousel comprises a plurality of data elements combined in a plurality of groups,
the apparatus comprising:
means for adding an activating element to at least a group of said plurality of groups of said data carousel,
said added activating element indicating either
an updating time at which at least one of the data element in the group is updated, or
a time interval for executing checks regarding the updating of at least one of the data elements of said group; and
means for performing checking on the basis of an activating element which is added for at least one group of at least one data element in the data carousel,
wherein said checking is performed in a test time intervals, until a confirmation regarding the updating is received,
wherein the test time interval allocated to checking is shorter than a preset time interval,
wherein a time of a next checking is determined by adding the test time interval to the updating time,
adding a status element for updating said at least one group of said plurality of groups of said data carousel,
wherein said status element indicates at least one of a regular updating and an irregular updating of the at least one data element of said group,
said irregular updating being the result of an unexpected change of the at least one of the data element, and
evaluating said status element to determine if the status element indicates a regular updating or an irregular updating,
wherein if said updating is an irregular updating, a time updating for the determination of the next point of time for a subsequent updating by means of the time interval is not considered, and
wherein if said updating is a regular updating a time of the actual updating is used for determining a time for a subsequent updating with the use of the activating element.

8. A non-transitory computer program product directly loadable into the internal memory of a digital computer, comprising software code portions for performing the steps of claim 1 when said product is run on a computer.

9. A non-transitory computer program product directly loadable into the internal memory of a digital computer, comprising software code portions for performing the steps of claim 4 when said product is run on a computer.

\* \* \* \* \*